(12) United States Patent
Gibran et al.

(10) Patent No.: US 6,280,369 B1
(45) Date of Patent: Aug. 28, 2001

(54) ROLLING PIN

(75) Inventors: Kahlil Gibran, Boston; Everett J. Firth, Dover, both of MA (US)

(73) Assignee: Vic Firth, Inc., Dedham, MA (US)

( * ) Notice: Subject to any disclaimer, the term of this patent is extended or adjusted under 35 U.S.C. 154(b) by 0 days.

(21) Appl. No.: 09/493,485

(22) Filed: Jan. 28, 2000

Related U.S. Application Data

(60) Provisional application No. 60/118,650, filed on Feb. 4, 1999.

(51) Int. Cl.[7] ....................................................... A21C 3/02
(52) U.S. Cl. ............................................ 492/14; 16/110 R
(58) Field of Search .................................. 492/14, 13, 16, 492/47; 16/110 R, DIG. 19; 74/543, 551.9

(56) References Cited

U.S. PATENT DOCUMENTS

| | | |
|---|---|---|
| 241,253 | 5/1881 | Twele . |
| 1,247,162 | 11/1917 | Southwick . |
| 1,323,410 | 12/1919 | Sams . |
| 1,433,576 | 10/1922 | Utke . |
| 1,461,815 | 7/1923 | Bird . |
| 3,244,122 | 4/1966 | Agler . |
| 3,831,238 | 8/1974 | Adams . |
| 4,070,742 | 1/1978 | Dorfman .............................. 29/110.5 |
| 4,314,395 | 2/1982 | Brock . |
| 4,426,200 | 1/1984 | Mueller ................................ 425/101 |
| 5,393,289 | 2/1995 | Green .................................... 492/13 |
| 5,652,009 | 7/1997 | Mair ..................................... 426/516 |

OTHER PUBLICATIONS

"Comfort pin rolled out as redesign of a classic tool for baking," Advertisement by Woodard & Charles in *Kitchen Ware News*, Jun. 1999.

Woodard & Charles 2000 brochure, p. 5, 485–21 South Broadway, P.O. Box 9052, Hicksville, NY 11802–9052.

*Primary Examiner*—S. Thomas Hughes
*Assistant Examiner*—Marc Butler
(74) *Attorney, Agent, or Firm*—Lahive & Cockfield, LLP

(57) ABSTRACT

A rolling pin includes a cylindrical working barrel with oppositely extending handles. The handles are contoured with strategically shaped surfaces and indentations configures to comfortably accommodate the shape of the user's hands, thereby alleviating stress and fatigue during protracted use.

7 Claims, 3 Drawing Sheets

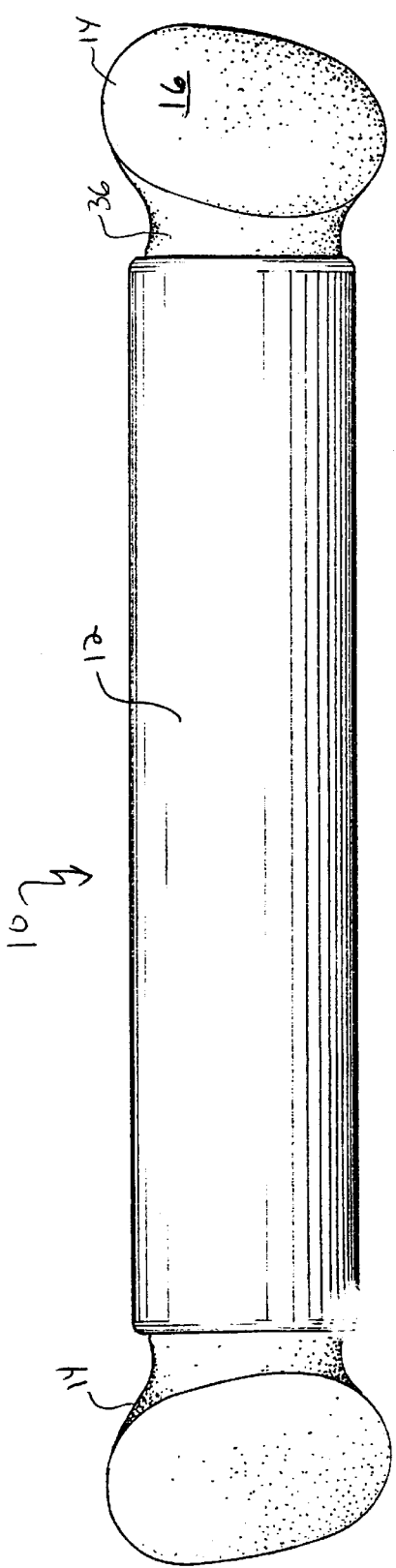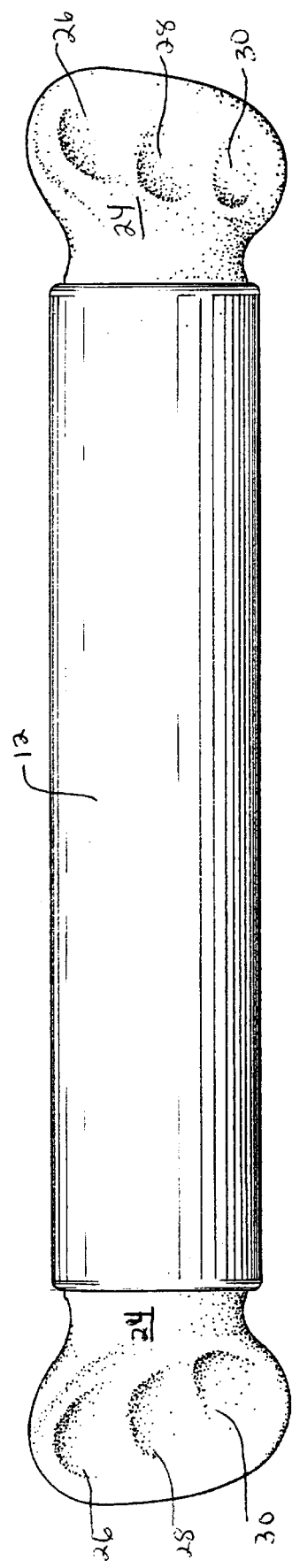

ROLLING PIN

This Application claims Benefit of provisional application Ser. No. 60/118,650 filed Feb. 4, 1999.

BACKGROUND OF THE INVENTION

The invention generally relates to rolling pins, and in particular to a rolling pin having handles which are molded to conform to a user's hand.

When using a rolling pin to flatten various materials, a considerable amount of pressure is applied to the cylindrical working barrel by the user's hands and wrists. Protracted use can be tiring and can create painful muscle stress. The objective of the present invention is to alleviate these problems by contouring the rolling pin handles to more efficiently fit the user's hands.

SUMMARY OF THE INVENTION

A rolling pin includes a cylindrical working barrel with oppositely extending handles. The handles are contoured with strategically shaped surfaces and indentations configured to comfortably accommodate the shape of the user's hands, thereby alleviating stress and fatigue during protracted use.

BRIEF DESCRIPTION OF THE DRAWINGS

These and other objects, features and advantages of the present invention will become more apparent in light of the following detailed description of preferred embodiments as illustrated in the accompanying drawings, wherein;

FIG. 2 is a top plan view of the rolling pin;

FIG. 3 is a bottom plan view; and

DETAILED DESCRIPTION OF THE INVENTION

Figure 1:
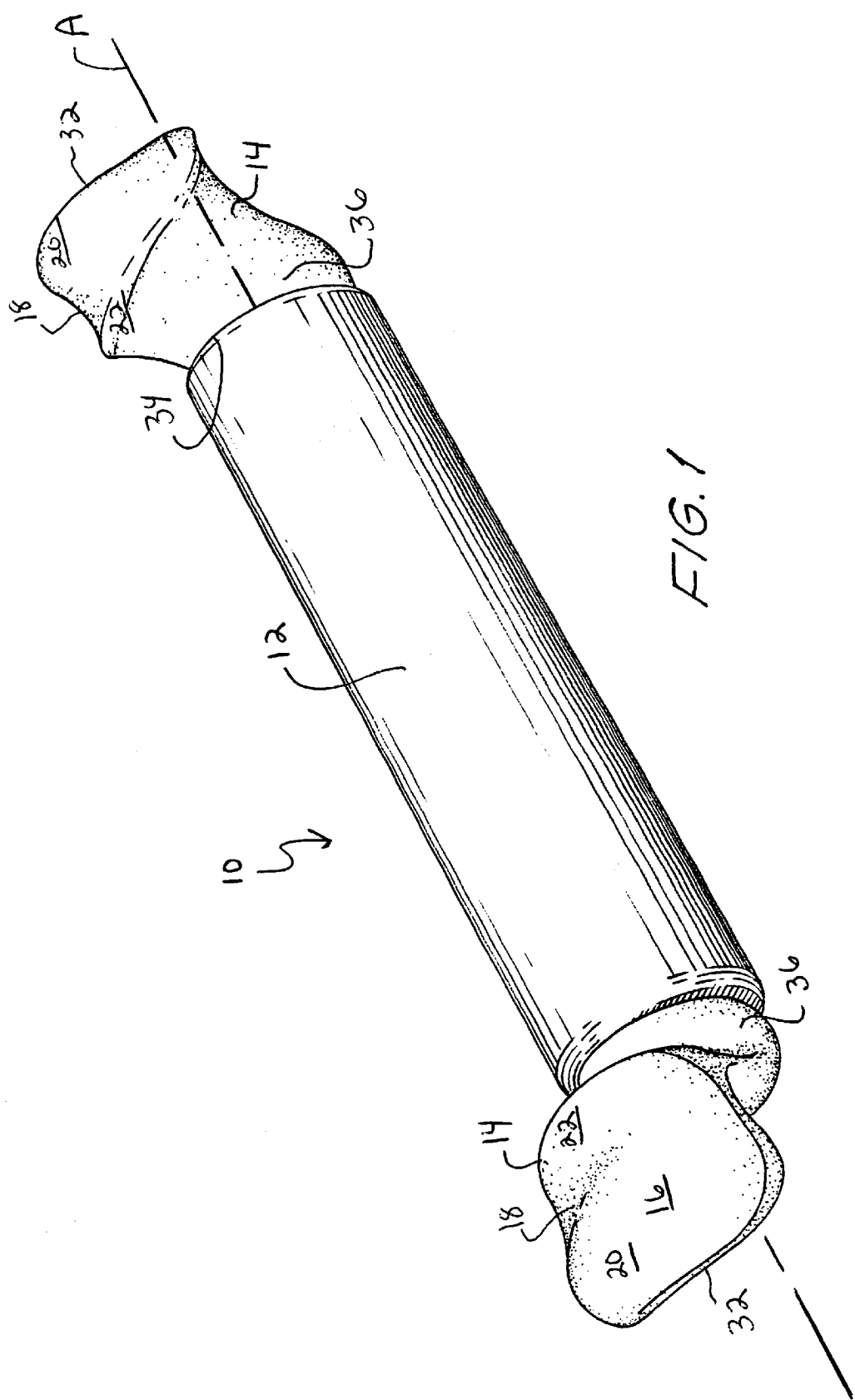
FIG. 1 is a perspective view of a rolling pin in accordance with the present invention.
Figure 4:
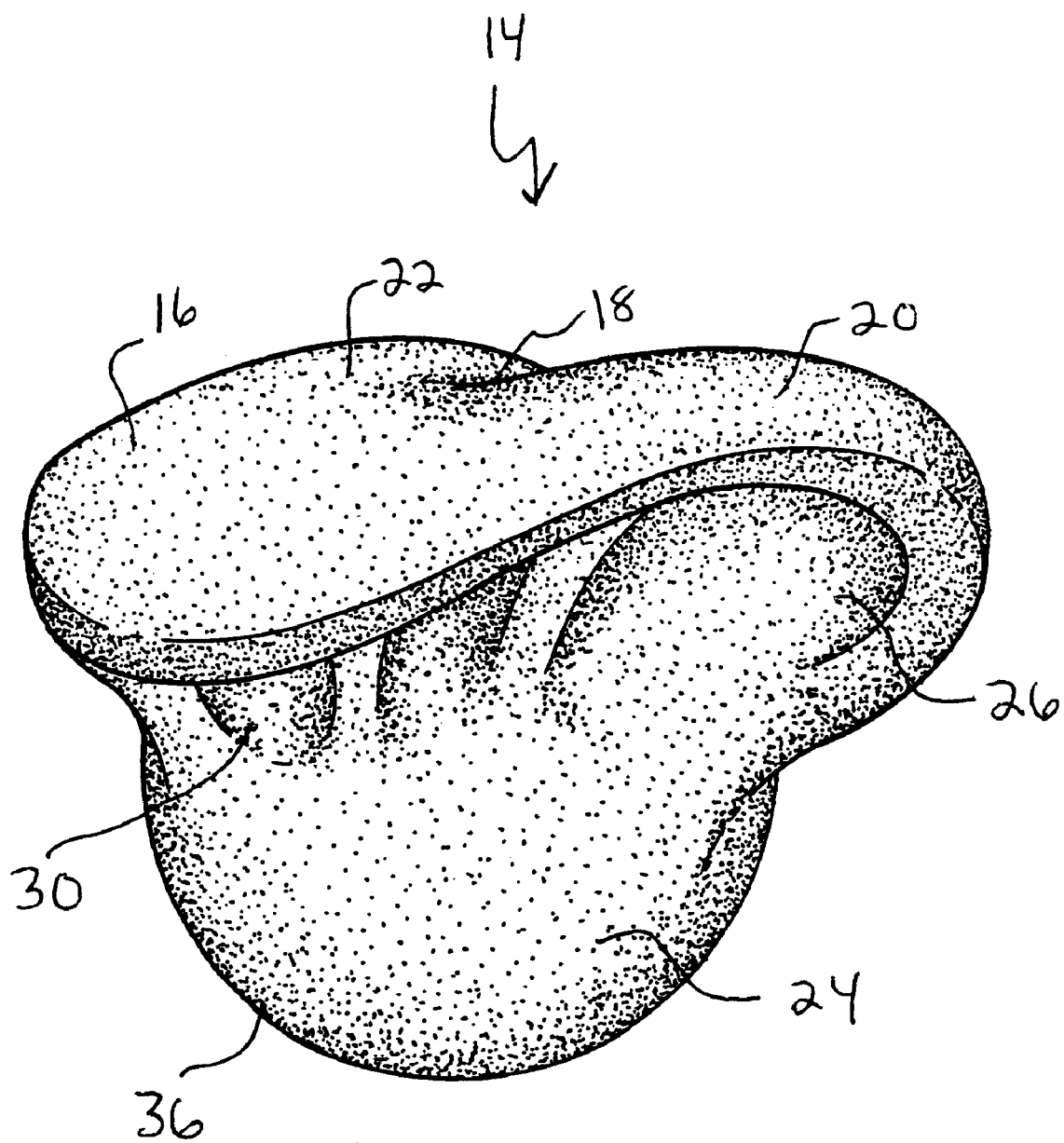
FIG. 4 is an end view of the right end of the rolling pin, the opposite end being a mirror image thereof.

A rolling pin 10 in accordance with the present invention includes a cylindrical working barrel 12 having oppositely extending handles 14. The handles 14 are connected to the ends of the central barrel 12 by conventional bearings (not shown) which accommodate rotation of the barrel relative to the handles about the one central barrel axis "A".

The handles 14 are contoured to conform to a user's hands when they are in a natural grasping position, thus being more comfortable to use while reducing the stress in the user's hands and wrists. The upper surface 16 of each handle 14 includes a generally centrally located concave depression 18 separating two gently curved convex areas 20, 22. The lower surface 24 of each handle 14 is generally concave and includes depressions 26, 28, 30 for the user's curled fingers to grasp. On one side of the handle 14, the upper and lower portions 16, 24 converge at an outer edge 32. Along the opposite side 34 of the handle 14, the upper and lower portions 16, 24 are joined to a cylindrical collar 36 rotatably coupled to the central barrel 12.

When using the rolling pin 10, the user curls his or her hands around the handles 14 such that the outer edges 32 of the handles 14 fit approximately across the distal palmar creases and into the hypothenar eminences. The fingers are then curled around to the lower portions 24 of the handles 14 and are seated in the depressions 26, 28, 30. The thenar eminences are rotated down onto the slightly curved portions of the upper portions of the handles while the thumbs are seated in depressions 18. This position allows the user to more effectively apply the entire palm area of the hand to maneuver the rolling pin as opposed to using an ordinary rolling pin wherein only the palm area at the roots of the fingers grasp the handles.

The handles may be made of polymeric material including acrylics, or they may be wood, metal or other similar type of materials. Polymeric handles may be formed using standard molding techniques. The cylindrical working barrel of the rolling pin may be wood, marble or stainless steel.

Although the present invention has been shown and described with respect to several preferred embodiments thereof, various changes, omissions and additions to the form and detail thereof, may be made therein, without departing from the spirit and scope of the invention.

What is claimed is:

1. A rolling pin comprising:

a cylindrical central working barrel; and two handles for maneuvering said rolling pin, one handle being coupled to each end of said cylindrical working barrel, said handles having a top and a bottom surface, said top and bottom surfaces converge at an outer edge of said handle, at an inner edge of said handle said upper and bottom surfaces are joined by a cylindrical collar which is rotatably coupled to said cylindrical working barrel, said top surface of said handle including a centrally located concave depression separating two gently curved convex areas, said bottom surface of said handle being concave and includes at least three recesses, such that when a user's hand is curled around said handle, the outer edge fits diagonally across a user's palm, said top surface conforms to the user's semi-curled palm and the thumb sits in said depression, and the user's fingers are seated in the recesses in the bottom surface of said handle.

2. The rolling pin of claim 1, wherein said handles are polymeric material, wood or metal.

3. The rolling pin of claim 2 wherein said handles are acrylic.

4. A handle which may be coupled to a device and be grasped by a user in order to maneuver the device, said handle having a top and a bottom surface, said top and bottom surfaces converge at an outer edge of said handle, an inner edge of said handle said upper and bottom surfaces are joined to a cylindrical collar, said top surface of said handle including a centrally located concave depression separating two gently curved convex areas, said bottom surface of said handle being concave and includes at least three recesses, such that when a user's hand is curled around said handle, the outer edge fits diagonally across a user's palm, said top surface conforms to the user's semi-curled palm wherein the thumb sits in said depression, and the user's fingers are seated in the recesses in the bottom surface of said handle.

5. The handle of claim 4, said handle is a polymeric material, wood or metal.

6. The handle of claim 5, wherein said handle is acrylic.

7. The rolling pin of claim 1, wherein said cylindrical central portion is stainless steel, marble or wood.

* * * * *